United States Patent [19]

Trema

[11] Patent Number: 4,702,338
[45] Date of Patent: Oct. 27, 1987

[54] SUSPENSION DEVICE FOR A VEHICLE WHEEL SUPPORT ARM AND FRONT-REAR COUPLING SYSTEM FOR SAID SUSPENSION

[75] Inventor: Daniel Trema, Bezons, France

[73] Assignee: Elf France, Courbevoie, France

[21] Appl. No.: 874,576

[22] Filed: Jun. 16, 1986

[30] Foreign Application Priority Data

Jun. 28, 1985 [FR] France ................. 85 09886

[51] Int. Cl.⁴ ............... B62K 25/16; B60G 21/04
[52] U.S. Cl. .................... 180/219; 280/275; 280/283; 280/284; 280/703
[58] Field of Search ............ 180/219; 280/275, 277, 280/660, 284, 283, 703

[56] References Cited

U.S. PATENT DOCUMENTS 4,265,329  5/1981  de Cortanze ............ 280/275
4,398,741  8/1983  Hiramatsu ............. 180/219

Primary Examiner—John J. Love
Assistant Examiner—Donn McGiehan
Attorney, Agent, or Firm—Burgess, Ryan and Wayne

[57] ABSTRACT

A suspension device of a rotary support arm of a vehicle wheel, in particular of a motorcycle, cooperating with a compression springs and front-rear coupling system of the suspension, wherein a bearing end of the compression spring is hinged at the free end of a long arm of a lever having two arms and three points of pivoting and free end of the short arm is connected to the end of a reaction rod, the device being applied to the design of a motorcycle suspension with linear characteristics and where the front-rear suspension coupling is simple to carry out.

9 Claims, 1 Drawing Figure

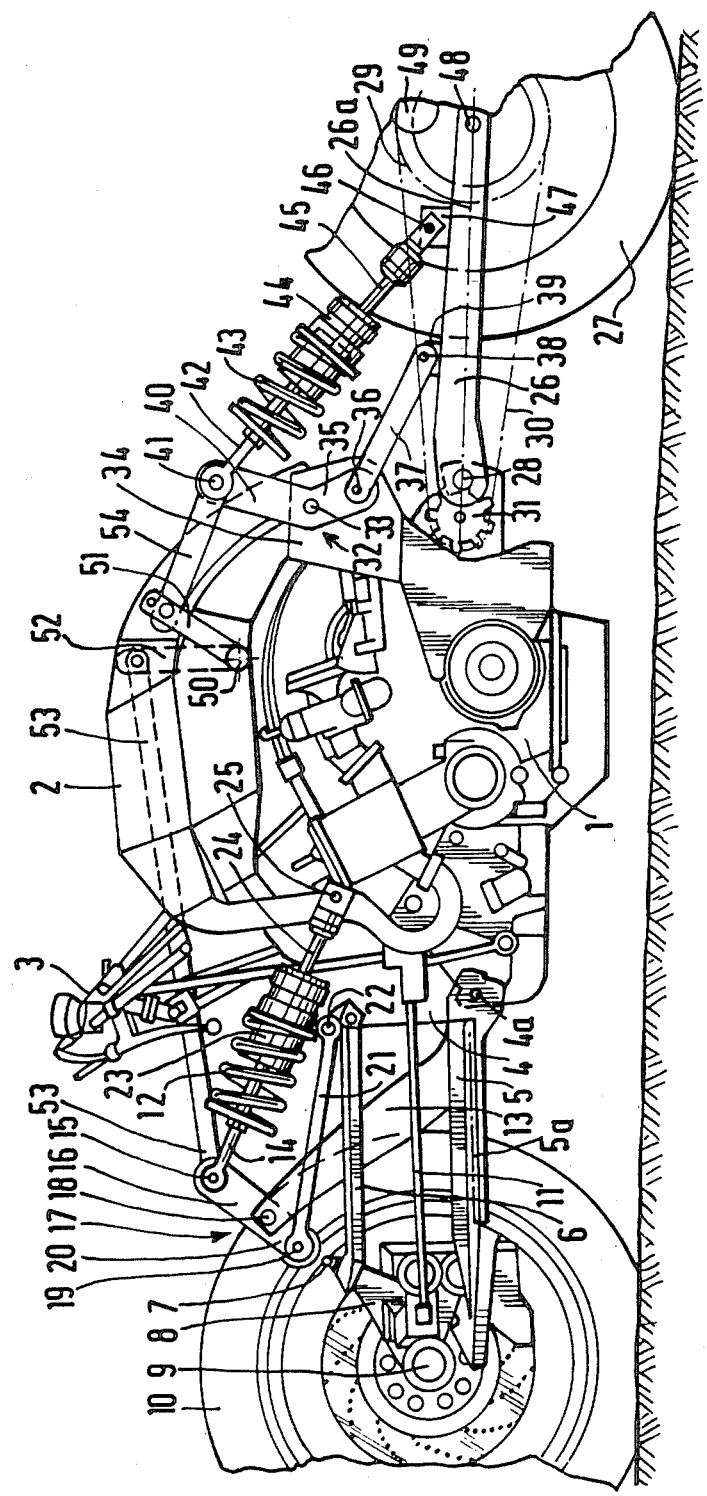

SUSPENSION DEVICE FOR A VEHICLE WHEEL SUPPORT ARM AND FRONT-REAR COUPLING SYSTEM FOR SAID SUSPENSION

BACKGROUND OF THE INVENTION

1. Field of the Invention

The present invention concerns a suspension device for a rotary support arm of a vehicle wheel, in particular for a motorcycle wheel, the said support arm being adapted to rotate reciprocally about a connecting axis integral with the chassis or the body of the vehicle in order to cooperate with a compression spring. The invention also concerns a frontrear coupling system for such a suspension.

2. Description of the Prior Art

The suspension of vehicles by means of rotary suspension support arms for each of the wheels is well known, in particular in the field of suspension of automotive vehicles where the rotary arm is advantageously rendered integral in rotation with one of the ends of a torsion bar the other end of which is anchored in the chassis of the vehicle. These compact and practical provisions cannot unfortunately be applied to motorcycles where there is insufficient width to transversally house a torsion bar spring.

In the field of motorcycles, the suspension spring is generally helicoidal spring incorporated about a hydraulic shock absorber jack and the shock absorbing and/or flexibility characteristics thereof are rapidly adjustable through the intermediary of notches or screws. The reciprocating displacement of the rotary support arm at the point of hinging of the suspension levers is furthermore amplified by levers at the bearing end of the compression spring, this amplification being exerted with variable rates as a function of the compression of the suspension so as to stiffen the suspension progressively as it is compressed, thereby reducing the risk of sudden jolts.

These amplification devices of variable rate stroke according to the compression of the suspension considerably complicate the system. On the other hand, the coupling of the front rear suspensions of a vehicle and substantially modify the interaction between the suspension spring and the shock absorber. It would thus be desirable, both for adjusting more easily the shock absorbing characteristics and to be able to connect the front and rear suspensions of a motorcycle, in order to reduce the swaying and the diving or "leap" of the front axle upon braking, to provide a front and/or rear suspension where the compression stroke of the suspension spring in the form of a helicoidal compression spring is amplified but in a way substantially proportional to the compression of the suspension or at least to the rotation of the wheel support arm.

SUMMARY OF THE INVENTION

One of the objects of the present invention is specifically to propose a front or rear motorcyle suspension of which the displacements of the bearing end of the compression spring are amplified substantially linearly with respect to the displacement of a central lever pivot which facilitates the possible front-rear coupling and the control of the suspension-shock absorber interaction.

With this object, one bearing end of the compression spring is hinged at the free end of the long arm by a lever with two arms and three hinging points, of which the free end of the small arm is connected to the end of a reaction rod, the other ends of the rod and of the spring being respectively either hinged at fixed points of the chassis of the vehicle while the central pivot of the lever with two arms is hinged on a rotary support extension, in the case of a motorcycle front suspension, or respectively hinged on extensions of the rotary support arm while the central pivot of the lever with two arms is hinged at a fixed point of the chassis, in the case of a rear motorcycle suspension, so that the relative displacement of the rod with respect to the central pivot during reciprocating displacement of the suspension is inverted by the lever with two arms and substantially linearly amplified in order to produce considerable variations in length of the compression spring from small displacements of the rod with respect to the central pivot of the lever. The suspension springs of the front and rear suspensions are helical springs mounted on guiding supports oriented in the same direction.

When the suspension device according to the invention applies to the rear wheel of a motorcycle, the compression spring is, preferably, guided on an axis and compressed between two end supports, one of which is hinged on an extension of the support arm on the side of the rear wheel with respect to the hinge of the rod on the support arm and the other is hinged on the end of the long lever arm and in average position of the reciprocated displacement suspension, the centering axis of the compression spring forms an angle smaller than 45° with respect to the median axis of the support arm and is substantially parallel to the median axis of the rod.

When the suspension device is applied to the front wheel of a motorcycle, the suspension spring can be guided on an axis and compressed between two end supports, one of which is hinged on the chassis of the vehicle to the rear of the hinge of the support arm on this chassis and the other of which is hinged on the end of the great lever arm and on its average position of the suspension reciprocated displacement, the guiding axis of the compression spring forms an angle smaller than 45° with respect to the median axis of the support arm and is substantially parallel to the median axis of the rod.

The foregoing provision means that the axis for guiding the suspension spring of the front wheel and the axis for guiding the suspension spring of the rear wheel can be substantially parallel, thereby allowing parallel suspension characteristics on the front and rear suspensions and facilitating their coupling.

In an alternative of the invention, when the suspension device is applied to the front wheel of a motorcycle connected by two hinging arms substantially parallel to the chassis of the vehicle, the compression spring, the lever with two arms and the rod are disposed above the two hinging arms and the central pivot of the lever with two arms is connected to an extension of one of the hinging arms, so that this central pivot undergoes a significant rotation and according to a direction close to the horizontal during reciprocated displacement of the suspension by rotation of the two hinging arms.

The coupling system between the suspension of the front wheel of a motorcycle and the suspension of the rear wheel of this motorcycle and having suspension devices of the type described herein-above, comprises on each front and rear side of the vehicle a rod of which one of the ends is hinged at the bearing end of the suspension spring while the other end is hinged to a final arm of a resilient rotary coupling member between the front and rear suspensions of the vehicle, the two rods each being coupled to one of the two opposing arms of the coupling member in order to be simultaneously displaced in the same direction, so that, with respect to a pre-set situation for distributing the compression of the front suspension and the rear suspension of the vehicle, an overload on the front wheel with respect to the pre-set situation is partially supported, via the rotary coupling member, by the rear wheel and vice versa for an overload on the rear wheel or for a reduction in the load supported by one of the suspensions. The resilient rotary coupling member is generally a torsion bar rotatively mounted transversally to the running direction of the vehicle, on at least one bearing borne by the vehicle and of which each end is connected at least in rotation to one of the final arms hinged to the corresponding rod that is in turn hinged to the respective front and rear suspension spring abutment.

BRIEF DESCRIPTION OF THE DRAWING

Other aims, advantages and features of the invention will become apparent from the following description of two preferred embodiments of the invention, given by way of non-limitative illustration, with reference to the single appended drawing in which the single FIGURE represents, from a side view with torn away parts and in elevation a motorcycle fitted with two embodiments of the suspension device according to the invention and with a front-rear coupling between these two embodiments.

DESCRIPTION OF THE PREFERRED EMBODIMENTS

The FIGURE, which represents the main parts of a motorcycle, also shows a power unit block 1 overmounted by exhaust pipes 2 and a steering bar 3 and extended by a front chassis 4 on which is hinged at 4a the main arm 5 of the front suspension. An upper arm 6 substantially parallel to arm 5 and also hinged to the front chassis 4 cooperates with the main arm 5 to support on the ball and socket joints (only the upper pivot 7 is represented) an inclined pivoting axis of a pivot support 8 of the stub axle 9 of the front wheel 10 the orientation of which is controlled by a rod 11 connected by universal joints to the steering bar 3.

The connection between the main arm 5 and a front suspension spring 12 is obtained according to the invention by means of a rigid extension 13 of the main arm 5. The bearing end 14 of the compression spring constituting the front suspension spring 12 is hinged at 15 to the free end of a long arm 16 of a lever 17 with two arms and three pivoting axes 15 (already mentioned hereinabove), 18 and 19. The short arm 20 of the lever 17 is hinged at 19 to the end of a reaction rod 21 the other end of which is hinged at 22 on the front chassis 4 adjacent to the hinge of the upper arm 6.

The suspension spring 12 is guided on a shock absorbing body 23 crossed through by a rod which forms the bearing end 14. The body 23 is extended by the side opposite end 14 by a connecting rod 24 hinged at 25 on the front chassis 4.

The operating of the front suspension of the motorcycle can be easily understood from the FIGURE. When an overload is applied to the front wheel 10, the main arm 5 and the upper arm 6 turn clock-wise around their hinging axes on the front chassis 4 also driving in rotation the rigid extension 13 and the central pivoting axis 18 to which it is connected and which also turns about the hinging axis 4a of the main arm 5.

During the rotation displacement of the central pivoting axis 18, the rod 21 imposes upon the lower axis of pivoting 19 of the short arm 20 a rotation about hinge 22, which appears as a rotation of the lever 17 around its central axis of pivoting 18. The reaction effect of the rod 21 thus provokes a clock-wise rotation of the lever with two arms 17 and a supplementary compression of the spring 12 which again balances the overload applied to the front wheel 10.

The rear part of the motorcycle shows that the support arm 26 of the rear wheel 27 is hinged at 28 on an extension of the pan unit block 1. The driving rear wheel 27 is provided with a sprocket wheel 29 driven in rotation by the motor by means of a chain 30 and a sprocket 31 of the block 1.

On the rear wheel suspension device according to the invention, a lever 32 with two arms is hinged by means of a central pivot 33 on a rear chassis 34 integral with the power unit block 1 and the short arm 35 of this lever is hinged at 36 at the end of a rod 37 the other end of which is hinged at 38 on an extension 39 of the support arm 26 of the rear wheel 27. The long arm 40 of the lever 32 is hinged at 41 at the bearing end 42 of the compression spring 43 of the rear suspension, mounted similar to front spring 12, on a shock absorbing body 44 of which the bearing rest 45 at the form of a rod is hinged in 46 on an extension 47 of the arm 26, closer to the rear wheel 27 than the extension 32 on which is hinged the rod 37. The arm 26 carries the axis 48 of the rear wheel as well as the brake calipers 49 and thus supports all the traction and braking torques applied to the rear wheel 27.

The operation of the suspension device of the rear wheel presents operating features similar to that of the front wheel and provokes a displacement in the same direction of the bearing 42 of the spring. When an overload is applied to the rear wheel 27, the support arm 26 turns counter clock wise which thus urges towards the left of the FIGURE the hinge 46 of the bearing end 45 of the spring 43 and the hinge 38 of the rod 37. The displacement of the rod 37 towards the left urges towards the left the hinge 36 of the lever 32 which turns clock wise by amplifying with respect to the hinge 41 the displacement of the bearing end 42 towards the right. The displacement of the wheel 27 upwards with respect to the chassis of the motorcycle and under the effect of an overload thus produces a supplementary compression of the compression spring 43, which balances the overload on the wheel 27.

It will be noted that through the provision of the invention, the front 12 and rear 43 suspension springs are helical springs mounted on respective bearing ends 14, 42 and 24, 45 forming guiding supports oriented in the same direction. As can be seen from the FIGURE, the longitudinal axis of the springs 12 and 43 forms an angle smaller than 45° with respect to the median axis 5a and 26a of the respective suspension arms 5 and 26. With a view to obtaining substantially identical suspension front and rear characteristics, in the mean position of the suspension reciprocated displacement, the longitudinal axes of the suspension springs 12 and 43 are disposed substantially parallel to each other.

To build the front suspension, the compression spring 12, the lever 17 with two arms and the rod 21 are disposed above the two suspension arms 5 and 6 and the connection of the central pivoting axis 18 to the extension 13 integral with the lower main arm 5 is made with a steep inclination of this extension 13 so that this axis 18 is subjected a significative rotation and according to a direction close to horizontal during the reciprocated displacement of the suspension by rotation of the two suspension arms 5 and 6. The extension 13 can be rendered integral with the upper arm 6 and not with the main arm 5, provided a rotation of the axis 18 which satisfies the conditions that have been described hereinabove is provided around the pivoting point of this arm 6.

The coupling between the front and rear suspension of the motorcycle represented on the FIGURE is obtained relatively easily by utilizing the suspension devices that are described herein-above. To do this is provided a torsion bar 50 rotary mounted in two bearings (not represented) of the chassis of the vehicle transversally to the longitudinal direction or the running direction of the vehicle, each end of the torsion bar being connected to a final rotary bar 51 and respectively 52. The rotary arm 51 is connected by a rod 54 to the bearing end 42 of the rear compression spring 43, preferably via the hinge 41 while the rotary arm 52 (represented in dotted lines since it is concealed by the exhaust pipes 2) is connected by a rod 53 to the bearing end 14 of the front compression spring 12, preferably via the pivoting axis 15 of the long arm of the lever 16. It will be noted that the rod 54 is relatively short while the long rod 53 is disposed above the power unit block 1.

The operating of the coupling device of the front and rear suspensions will now be described. The front and rear suspensions are represented in normal load position with the pilot or rider sitting on the motorcycle. It is supposed that the pilot brakes sharply; the load of the vehicle is thus partially transferred onto the front wheel 10 due to the deceleration that follows braking and the spring 12 tends to be compressed even more, thereby provoking the displacement towards the right of the FIGURE of the bearing end 14 and of the hinge axis 15 and tends to cause the arm 52 to turn in a clock-wise direction.

The torsion bar 50 resiliently drives the opposite lever arm 51 in rotation in the same direction, thereby compressing the spring 43 which tended to expand due to the weight transfer onto the front. Under the effect of the supplementary reaction of rear suspension spring 43, the torsion bar 50 is partially twisted so that only a part of the front overload is transmitted to the rear, which nevertheless prevents rocking, typically called "leaping" of the motorcycle towards the front during braking, or at least considerably reduces it.

In the contrary case, for example during reacceleration that follows a braking phase, the front wheel 10 is released of part of its load and the bearing end 14 is displaced towards the left of the FIGURE with the hinge axis 15 which tends to cause turning of the lever arm 52 counter-clockwise. The lever arm 51 turns in the same direction and the rod 54 thus urges the bearing end 42 of the spring 43 towards the right of the FIGURE and also releases the rear suspension. The front left release is thus limited and the motorcycle driver maintains good steering adherence on the front wheel during sudden acceleration operations. It can be seen that the coupling according to the invention between the front and rear suspensions is efficiently opposed to the development of compression asymmetries between the front and rear suspensions, this opposition being able even to be effective in the case where one of the suspensions would tend to weaken accidentally, for example, upon rupture of one of the suspension springs 12 or 43.

The torsion bar 50, normally rotary-mounted within two bearings (not represented) of the chassis, can be attached to the chassis between these two bearings to thereby constitute a front and/or rear suspension spring and no longer a coupling element for the front and rear suspensions. The suspension spring constituted by this torsion bar 50 can thus be utilized alone as a suspension spring instead of the front 12 and/or rear springs, or combined with these springs. Such a torsion bar suspension bar presents the advantage of being very compact and easily adjustable for prestressing.

The coupling that has been proposed on the FIGURE by the means of rods, levers and a torsion bar can be carried out, where necessary, by other means such as cable and sheath systems. Furthermore, it will be understood that the helicoidal suspensions springs 12 and 43 can present orientations which differ from the substantially parallel orientation represented, provided that their inclination varies only slightly during reciprocated displacement of the suspension. By modifying the length of the rods 52 and/or 54 by means, for example, of a screwed connection, when the front and rear suspensions are loaded, it is possible to modify the balance point between the front and rear suspensions loads and thus to correct the trim of the loaded vehicle while ensuring a good coupling between the front and the rear of the motorcycle.

It is well understood that the present invention is in no way limited to the embodiments explained and described herein-above, and can be adapted to numerous variants available to those skilled in the art without departing from the scope and spirit of the invention.

I claim:

1. A suspension device for use with a main support arm of a wheel of a motorcycle said main support arm being connected for reciprocated pivotal displacement about a connecting axis integral with a chassis of the motorcycle for cooperation with a suspension compression spring, said device comprising:

a lever having a long arm with a free end,
a short arm and first, second and central pivoting points;
a reaction rod having a first end connected to the short arm and a second, opposite end pivotally connected effectively to a fixed point on the chassis;
the free end of the long arm of the lever being pivotally connected to a first abutting end of the compression spring at a pivot point;
the compression spring having a second end pivotally connected to a fixed point on the chassis;
said main support arm including an extension pivotally connected to said lever;
said main support arm being pivotally connected to said central pivoting point of said lever when said suspension device is used as a front suspension of the motorcycle;
said main support arm being pivotally connected to one of said first and second pivoting points, and said lever being pivotally connected to a fixed point on said chassis at said central pivoting point, when said suspension device is used as a rear suspension of the motorcycle;
whereby said lever causes a reversal in the direction of movement of the reaction rod with respect to said said central pivoting point and amplifies said movement at the pivot point where the compression spring is pivotally connected to the long arm of the lever.

2. A suspension device according to claim 1; wherein said motorcycle includes a front suspension compression spring and a rear suspension compression spring and both of said front and rear suspension compression springs are helical springs mounted on guiding brackets oriented in the same direction.

3. A suspension device according to claim 1; wherein said wheel is a rear wheel of the motorcycle;

the second opposite end of the reaction rod is pivotally connected to a fixed point on the chassis through said main support arm, wherein said second, opposite end of said reaction rod is pivotally connected to said main support arm at a pivot point;

said suspension compression spring is moveable along a longitudinal axis; and further comprising two end supports which compress said suspension compression spring therebetween;

one of said two end supports being pivoted on an extension of the main support arm on the same side of the rear wheel as the pivot point at which the reaction rod is pivotally connected to the main support arm; and the other end support being pivotally connected to the free end of the long arm of the lever;

wherein the length of the compression spring along its longitudinal axis forms an angle smaller tan 45° with respect to a median axis of the main support arm for an average position of a suspension stroke.

4. A suspension device according to claim 3; wherein the longitudinal axis of the suspension compression spring is substantially parallel to a median axis of the reaction rod.

5. A suspension device according to claim 1; wherein said wheel is a front wheel of the motorcycle;

further comprising two abutting ends between which the suspension compression spring is axially guided and compressed;

one of the two abutting ends being pivotally connected on the chassis of the motorcycle, rearwardly of a pivotal connection of the main support arm on the chassis; and the other abutting end being pivotally connected to the long arm of the lever;

wherein the length of the suspension compression spring along a longitudinal axis thereof forms an angle smaller than 45° with respect to a median axis of the main support arm for an average position of a suspension stroke.

6. A suspension device according to claim 5; wherein the length of the suspension compression spring along its longitudinal axis is substantially parallel to a median axis of the reaction rod.

7. A suspension device according to claim 1; wherein said motorcycle has a front wheel and a rear wheel, a front suspension compression spring associated with the front wheel and a rear suspension compression spring associated with the rear wheel and longitudinal axes of the front and rear suspension compression springs are substantially parallel to each other.

8. A suspension device according to claim 1;
wherein said wheel is a front wheel of the motorcycle;
further comprising two substantially parallel hinging arms for connecting the suspension device to the chassis of the motorcycle;

wherein the suspension compression spring, the lever and the reaction rod are positioned above the main support arm; and the central pivoting point of the lever is connected to the main support arm, whereby said central pivoting point reciprocally moves along a direction close to horizontal during reciprocated movement of the front wheel suspension.

9. A suspension device for use with a front main support arm of a front wheel of a motorcycle and a rear main support arm of a rear wheel of the motorcycle, the front and rear main support arms being connected for reciprocated pivotal displacement about a connecting axis intergral with a chassis of the motorcycle for cooperation with front and rear suspension compression springs, respectively, said device comprising:

a front suspension device including:
a front lever having a front long arm with a free end, a front short arm, a first front pivoting point, a second pivoting point and a central front pivoting point;
a front reaction rod having a first end connected to the front short arm and a second, opposite end pivotally connected to a fixed point on the chassis;
the free end of the front long arm of the lever being pivotally connected to a first abutting end of the front compression spring at a pivot point;
the front compression spring having their second end pivotally connected to a fixed point on the chassis;
said front main support arm including an extension pivotally connected to the central pivoting point of the front lever;

a rear suspension device including:
a rear lever having a rear long arm with a free end, a rear short arm, a first rear pivoting point, a second rear pivoting point and a central rear pivoting point;
a rear reaction rod having a first end connected to the rear short arm and a second, opposite end pivotally connected to the rear main arm;
the free end of the rear long arm of the rear lever being pivotally connected to a first abutting point of the rear compression spring at a pivot point;
the rear compression spring having a second end pivotally connected to a fixed point on the chassis;
said rear main support arm including an extension pivotally connected to one of the first and second pivoting points;
the rear lever being pivotally connected to a fixed point on the chassis at the central pivoting point;
a front coupling rod having one end pivotally connected to an abutting end of the front suspension compression spring;
a rear coupling rod having one end pivotally connected to an abutting end of the front suspension compression spring; and
a rotatable torsion bar mounted to the motorcycle transversely to a direction of movement of the motorcycle by at least one bearing, one end of said torsion bar being pivotally connected to one coupling rod and an opposite end of the torsion bar being pivotally connected to the other coupling rod so that the two coupling rods are simultaneously displaced in the same direction, whereby with respect to a pre-set distribution of the suspension compression springs of the motorcycle, load variation of the front wheel with respect to the pre-set distribution is partially distributed on to the rear wheel and visa versa.

* * * * *